United States Patent
Ahn et al.

(10) Patent No.: US 9,333,944 B2
(45) Date of Patent: May 10, 2016

(54) ANCHOR PRETENSIONER FOR VEHICLE

(71) Applicant: Hyundai Motor Company, Seoul (KR)

(72) Inventors: Taeg Young Ahn, Suwon-Si (KR);
Beom Jung Kim, Hwaseong-Si (KR);
Eung Joo Kim, Suwon-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/561,136

(22) Filed: Dec. 4, 2014

(65) Prior Publication Data
US 2015/0251630 A1  Sep. 10, 2015

(30) Foreign Application Priority Data
Mar. 5, 2014 (KR) .................. 10-2014-0025925

(51) Int. Cl.
*B60R 22/46* (2006.01)
*B60R 22/195* (2006.01)
*B60R 22/18* (2006.01)

(52) U.S. Cl.
CPC ......... *B60R 22/4628* (2013.01); *B60R 22/1951* (2013.01); *B60R 22/1955* (2013.01); *B60R 2022/1806* (2013.01)

(58) Field of Classification Search
CPC  B60R 22/46; B60R 22/1955; B60R 22/4628; B60R 2022/4638; B60R 22/4633
See application file for complete search history.

(56) References Cited

U.S. PATENT DOCUMENTS 8,517,425 B2    8/2013  Kim
2004/0046382 A1 *  3/2004  Ball .................. B60R 22/1955
                                                 280/806

FOREIGN PATENT DOCUMENTS

| JP | 2007-118776 A | 5/2007 |
| KR | 10-2004-0037942 A | 5/2004 |
| KR | 10-2010-0026437 A | 3/2010 |
| KR | 10-2010-0064174 A | 6/2010 |
| KR | 10-1382446 B1 | 4/2014 |

* cited by examiner

*Primary Examiner* — Ruth Ilan
(74) *Attorney, Agent, or Firm* — Morgan, Lewis & Bockius LLP

(57) ABSTRACT

An anchor pretensioner for a vehicle may include a bracket installed at a vehicle body side or a seat side, a cylinder installed on a lower end portion of the bracket, and in which a microgas generator (MGG) for generating explosive pressure is embedded, a rack installed in the cylinder, and moved upward by the explosive pressure, a rotator rotatably installed on an upper end portion of the bracket, engaged with the rack through a gear portion at a lower end of the rotator, and rotated when the rack is moved upward, and a lower anchor plate coupled to an upper end of the rotator, and connected to a webbing.

5 Claims, 10 Drawing Sheets

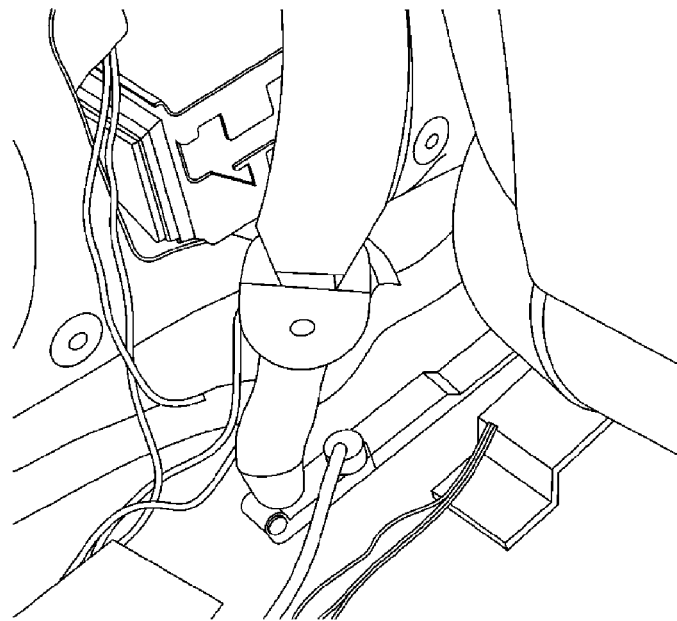
FIG. 9B (Prior Art)
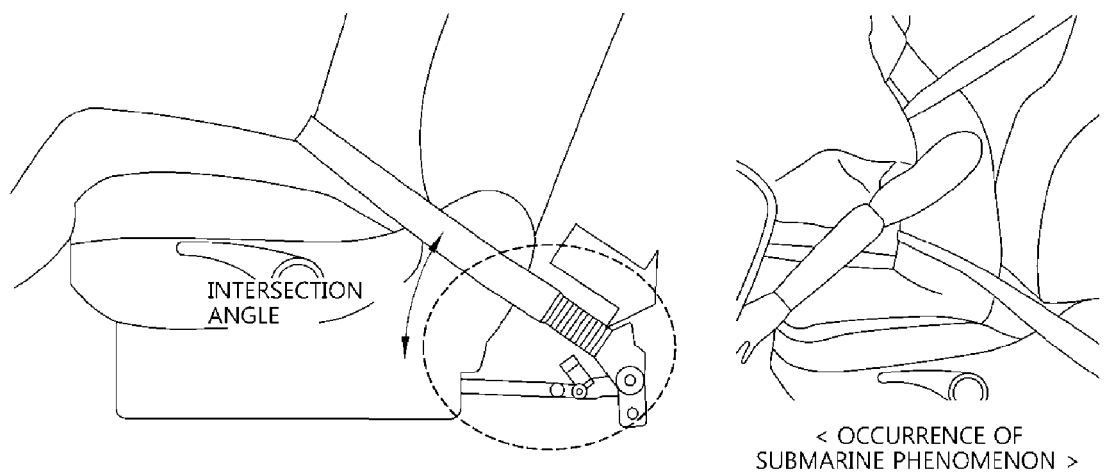
FIG. 9C (Prior Art)
FIG. 9D (Prior Art)

ANCHOR PRETENSIONER FOR VEHICLE

CROSS-REFERENCE TO RELATED APPLICATION

The present application claims priority to Korean Patent Application No. 10-2014-0025925 filed Mar. 5, 2014, the entire contents of which is incorporated herein for all purposes by this reference.

BACKGROUND OF THE INVENTION

1. Field of the Invention

The present disclosure relates to an anchor pretensioner for a vehicle. More particularly, it relates to an anchor pretensioner which may safely protect an occupant by restricting a pelvis area of the occupant at an early stage of a vehicle collision.

2. Description of Related Art

In general, drivers, who use vehicles that become high graded in quality and large in size, are greatly interested in safety devices capable of safely protecting passengers as well as basic vehicle performance such as traveling performance, ride quality, and speed.

The safety devices for a vehicle, which are exemplified by a seat belt, an airbag, a steering safety shaft, and the like, are automatically operated at the time of a vehicle accident so as to maximally protect drivers and occupants, and are globally recognized as safety devices that need to be essentially installed in the vehicles.

Typically, the seat belt is formed of a high tensile fibrous material, and has a detachable buckle.

A spool, on which the seat belt is wound, is fixed to a side wall of a vehicle body, in order to improve convenience for a user, and serves to freely release or wind the seat belt.

The spool is rotatably installed on a frame, and configured to be restored to an original position using spring elastic force.

Meanwhile, a seat belt retractor has an impact sensor for temporally fixing a reel when the seat belt is instantaneously released from the reel while an upper body of the driver or the occupant is instantaneously moved forward when the vehicle is suddenly decelerated due to a head-on collision or the like.

However, on the contrary to the original object of the seat belt which restricts the driver or the occupant on the seat, there is a drawback in that a face of a user collides with a window or a steering wheel in an actual accident.

The reason is that there is a gap between the upper body of the driver or the occupant and the seat belt and the back of the seat immediately after the collision, and a device, which achieves safety of the driver or the occupant by eliminating the gap, is referred to as a pretensioner.

FIG. 8 illustrates an example of an anchor pretensioner in the related art.

The anchor pretensioner is mounted on a "B" pillar lower end or a seat of a vehicle, serves to restrict a pelvis area of the occupant at an early stage of a vehicle collision, and has a structure for axially drawing in a lap belt webbing.

For example, when a deployment signal is input from an Airbag Control Unit (ACU), a microgas generator (MGG) 200 is ignited, a piston 210 is moved along a cylinder 220 by explosive pressure, and consecutively, a cable 230 connected to the piston 210 is pulled, such that the cable 230 and the lap belt webbing 240 are connected by a connector 250 so as to restrict the pelvis area of the occupant.

In order to prevent the lap belt webbing from being withdrawn after maximally drawing in the lap belt webbing, a locking structure mounted on the piston 210 is operated against a load that is applied in the reverse direction by the occupant.

However, the anchor pretensioner in the related art has the following drawbacks.

Firstly, the cable and the connector of the pretensioner are exposed to the outside by 100 mm or more in a state in which the anchor pretensioner is mounted in the vehicle, and as a result, the anchor pretensioner in the related art is disadvantageous in terms of an external appearance (FIG. 9A).

Secondly, in a case in which a bellows made of rubber is applied to improve the external appearance when drawing in the pretensioner, the bellows hinders an operation of the pretensioner while being compressed when the pretensioner is drawn in, and as a result, a drawing amount is reduced (deviation occurs) (FIG. 9B).

Thirdly, when the occupant is moved forward due to the vehicle collision, a belt intersection angle is gradually reduced, and as a result, there is a problem in that the lap belt is caught in the belly (submarine phenomenon) (FIG. 9C and FIG. 9D).

Here, the intersection angle is increased when an initial mount position of the pretensioner is moved in a forward/downward direction of the vehicle, but it is difficult to increase the intersection angle because of a layout of the vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of present invention are directed to providing an anchor pretensioner for a vehicle, which may improve external appearance quality of the vehicle, and may resolve a problem with a submarine phenomenon by changing an operation direction of the anchor pretensioner, which restricts a pelvis area of an occupant at an early stage of a vehicle collision, from an axial direction to a rotation direction, and by implementing a new type of pretensioner to which a rack/rotator locking system and a rack/rotator deviation prevention system are applied.

According to various aspects of the present invention, an anchor pretensioner for a vehicle may include a bracket installed at a vehicle body side or a seat side, a cylinder installed on a lower end portion of the bracket, and in which a microgas generator (MGG) for generating explosive pressure is embedded, a rack installed in the cylinder, and moved upward by the explosive pressure, a rotator rotatably installed on an upper end portion of the bracket, engaged with the rack through a gear portion at a lower end thereof, and rotated when the rack is moved upward, and a lower anchor plate coupled to an upper end portion of the rotator, and connected to a webbing.

The cylinder including the rack may be installed in a vertical direction, and the rotator may be rotated while being tilted downward from the vertical direction when the rack is moved upward. By the operating manner in the rotation direction of the pretensioner, external appearance quality of the vehicle may be improved, and a problem with a submarine phenomenon may be resolved.

The anchor pretensioner may further include a stopper, formed on the bracket, in which the stopper is perpendicularly bent from a bracket body, and serves to guide the rack while supporting a back surface portion of the rack when the rack is moved, and prevents the rack from deviating from the cylinder.

A locking ball may be interposed in a lower end portion of the rack and prevent reverse direction movement of the rack engaged with the rotator.

The locking ball, which prevents reverse direction movement of the rack, may further be interposed between a tapered surface formed on a piston portion at a lower end of the rack and the cylinder when the rack is moved downward so as to prevent the reverse direction movement of the rack.

The anchor pretensioner for a vehicle provided by the present invention has the following advantages.

Firstly, an intersection angle is increased when an occupant is moved forward at the time of a vehicle collision, thereby preventing a submarine phenomenon.

Secondly, a cable or the like is not exposed to the outside in a state in which the anchor pretensioner is mounted in the vehicle, thereby improving an external appearance.

Thirdly, a bellows, which has been used in the related art, may be eliminated, thereby reducing a deviation of a drawing amount (pelvis restriction).

Fourthly, the operation direction of the anchor pretensioner is changed from the axial direction to the rotation direction by using a combination of the rack and the rotator which cooperate when the cylinder is operated, thereby improving operability of the pretensioner, and ensuring operational quality.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 9A, FIG. 9B, FIG. 9C, and FIG. 9D are figures illustrating problems of the pretensioner in the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
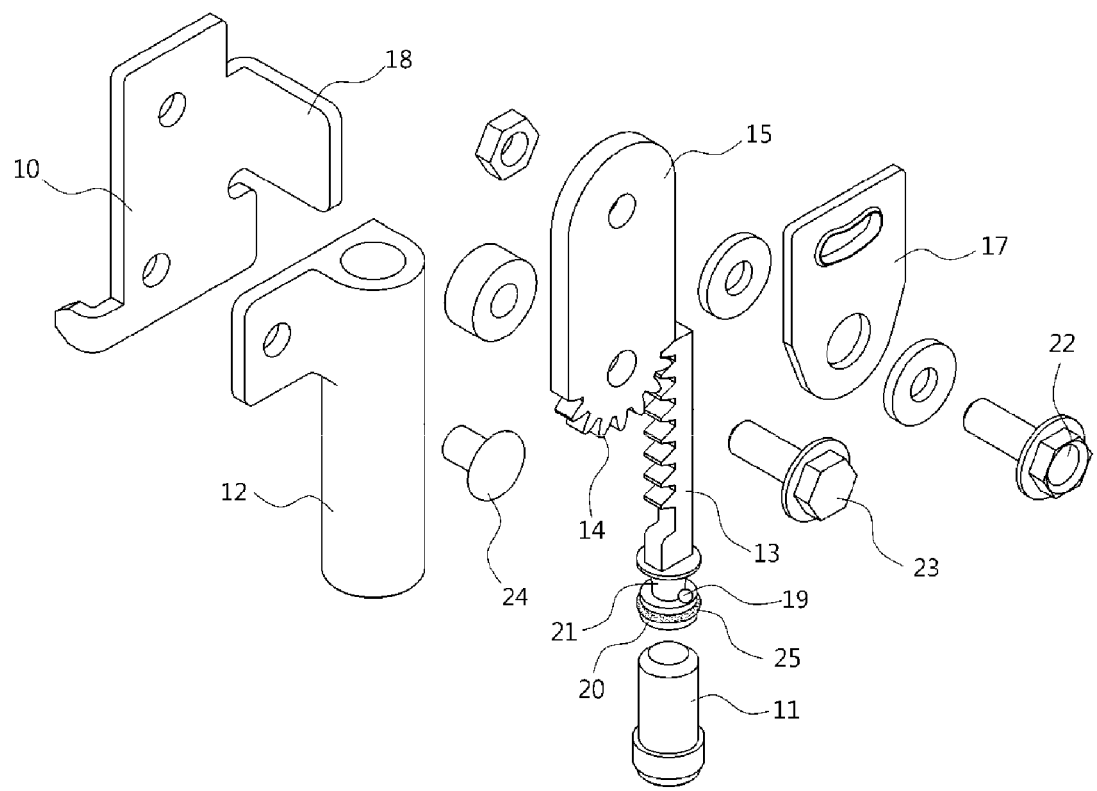
FIG. 1 is an exploded perspective view illustrating an exemplary anchor pretensioner according to the present invention.
Figure 2:
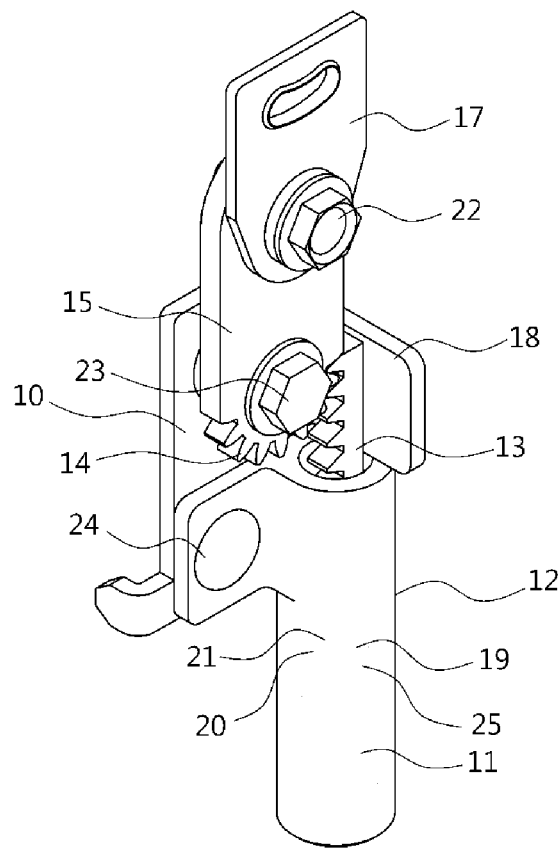
FIG. 2 is a coupled perspective view illustrating the exemplary anchor pretensioner according to the present invention.

FIG. 1 is an exploded perspective view illustrating an anchor pretensioner according to various embodiments of the present invention, and FIG. 2 is a coupled perspective view illustrating the anchor pretensioner according to various embodiments of the present invention.

As illustrated in FIGS. 1 and 2, the anchor pretensioner has a structure that changes an operation direction to a rotation direction, thereby improving external appearance quality, preventing a submarine phenomenon, and improving operability for holding an occupant.

To this end, a bracket 10, which is installed at a vehicle body side such as a lower end position of a center pillar (B pillar) or at a seat side such as a seat frame, is provided, and holes are formed at an upper end side and a lower end side of the bracket 10, respectively, such that a rotator 15 and a cylinder 12, which will be described below, may be fastened by a fastening structure through the respective holes.

In particular, a stopper 18, which is perpendicularly bent from a bracket body, that is, bent at 90° to be formed integrally with the bracket 10, is provided at one side of a side end of the bracket 10, and the stopper 18 not only serves to guide a rack 13, which will be described below, while coming into contact with a back surface portion of the rack 13 and supporting the back surface portion when the rack 13 is moved upward and downward, and but also serves to prevent the rack 13 from deviating from the cylinder 12.

The cylinder 12 in which a microgas generator (MGG) 11 for generating explosive pressure is embedded, is installed at a lower end portion of the bracket 10.

For example, the cylinder 12 is installed to have a structure in which an extended portion at one side of an upper end thereof is fastened to the hole formed at the lower end side of the bracket 10 by a rivet 24, and a vertical posture of the cylinder 12 may be made in a case in which the cylinder 12 is installed as described above.

The MGG 11 is disposed on a bottom in the cylinder 12, and when the MGG 11 is operated, the rack 13, which will be described below, may be moved upward by the explosive pressure.

Here, the MGG 11 is a typical MGG that is operated by receiving a signal from a sensor at the time of a vehicle collision, and thus, a specific description thereof will be omitted.

The rack 13, which is moved upward by the explosive pressure of the MGG 11, is installed in the cylinder 12.

The rack 13 is formed in a shape in which rack gears are formed in a predetermined length section, and a piston portion 20, which comes into close contact with an inner wall of the cylinder, is formed integrally with a lower end portion of the rack 13 such that the piston portion 20 may receive the explosive pressure of the MGG 11 in the cylinder.

In this case, a rubber seal ring 25 is mounted on a circumference of the piston portion 20 such that airtightness with the inner wall of the cylinder may be ensured, and as a result, the piston portion 20 may entirely receive the overall amount of explosive pressure.

In particular, a tapered surface 21, which has a shape having a diameter that decreases in a downward direction along a length direction of the rack, is formed on the piston portion 20 of the rack 13, and a locking ball 19, which will be described below, is interposed between the tapered surface 21 and the inner wall of the cylinder 12, such that the downward movement, that is, the reverse direction movement of the rack 13 may be restricted.

In this case, the locking ball 19 may be installed by being freely interposed in a space in the cylinder which is made by an upper surface of a circular body of the piston portion 20 and a small diameter portion below the tapered surface 21.

As a means for substantially pulling a webbing (reference numeral 16 in FIG. 7), the rotator 15 is provided.

The rotator 15 is formed in a long plate shape, a lower end of the rotator 15 is formed in a semi-circular shape, and a gear portion 14, which is engaged with the rack 13, may be formed in the semi-circular section.

Holes are formed at an upper end side and a lower end side of the rotator 15, respectively, the rotator 15 may be rotatably installed by fastening the lower hole of the rotator to the upper hole formed in the bracket 10 by a mounting bolt 23, and in this state, the rotator 15 may be engaged with the rack 13 through the gear portion 14 formed at the lower end of the rotator 15.

That is, when the rack is moved upward, the rotator 15 may be rotated while being tilted downward from the vertical posture by using the mounting bolt 23 at the lower end as an axis.

As a means for connecting the webbing 16, a lower anchor plate 17 is provided, and the webbing 16 for restricting a body of an occupant may be connected by being inserted in a hole that is formed in the lower anchor plate 17 and has a long hole shape.

The lower anchor plate 17 may be rotatably installed by fastening a hole formed at a lower end of the lower anchor plate 17 to the upper hole formed in the rotator 15 by an anchor bolt 22.

Figure 3A:
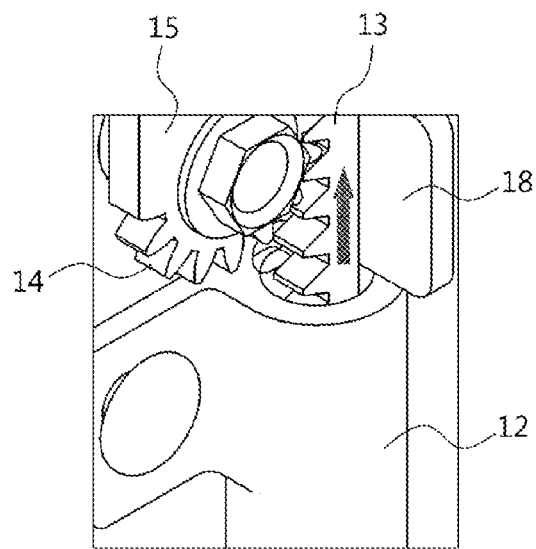
FIG. 3A and FIG. 3B are perspective views illustrating a rack/rotator deviation prevention structure of the exemplary anchor pretensioner according to the present invention.
Figure 3B:
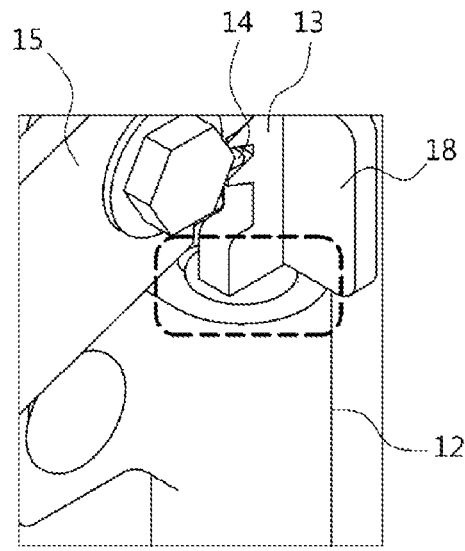

FIG. 3A and FIG. 3B are perspective views illustrating a rack/rotator deviation prevention structure of the anchor pretensioner according to various embodiments of the present invention.

As illustrated in FIG. 3A and FIG. 3B, when the rotary anchor pretensioner of the present invention is operated, the anchor pretensioner serves to guide the rack 13 to be moved in an axial direction (for example, in an axial direction of the cylinder), and serves to prevent the rack 13 from deviating from the cylinder due to the explosive pressure of the MGG 11.

That is, when the rack 13 is moved upward by the explosive pressure of the MGG 11, the rack 13 is guided by the stopper 18 while being moved in a vertical direction in a state in which the rack 13 is in contact with an inner surface of the stopper 18 formed on the bracket 10. In addition, a lower end side of the rack 13, for example, a flange portion, which radially protrudes between a lower end of the rack and an upper end of the tapered surface 21, comes into contact with the lower end portion of the stopper 18, such that the rack 13 may be prevented from deviating from the cylinder.

Figure 4A:
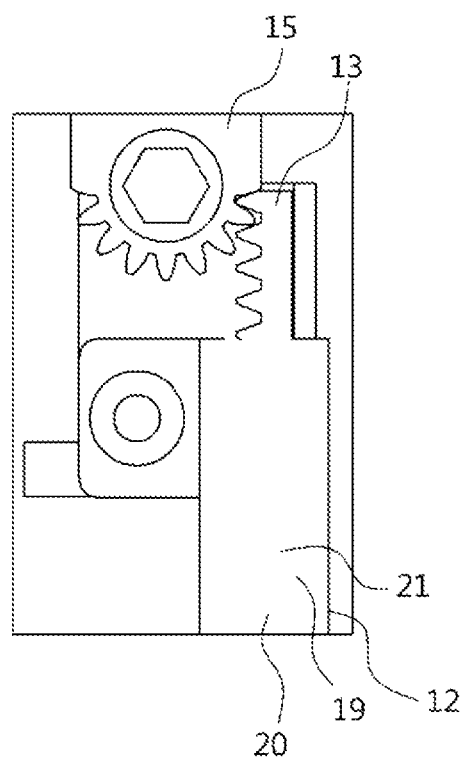
FIG. 4A, FIG. 4B and FIG. 4C are front views illustrating a rack/rotator locking structure of the exemplary anchor pretensioner according to the present invention.
Figure 4B:
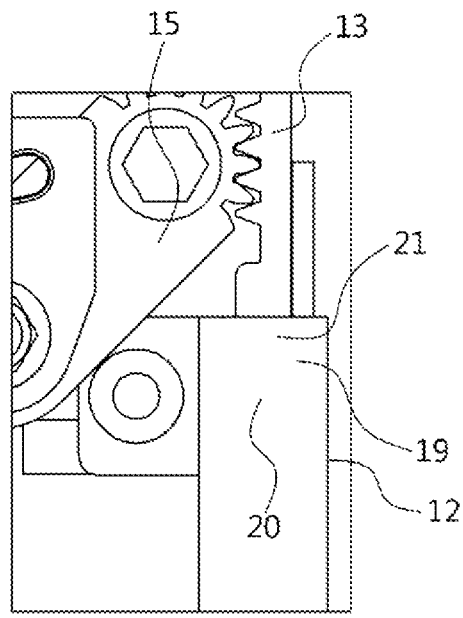
Figure 4C:
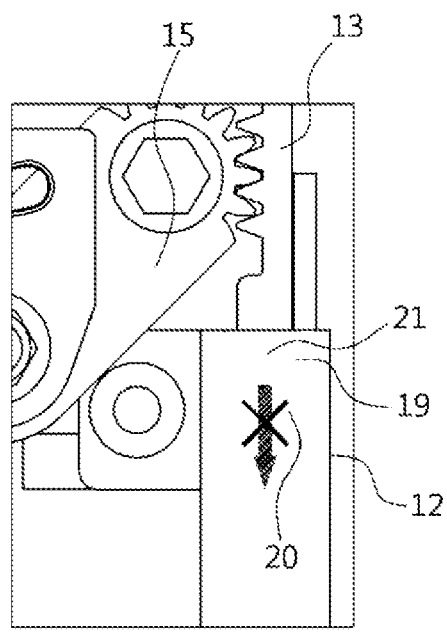

FIG. 4A, FIG. 4B and FIG. 4C are front views illustrating a rack/rotator locking structure of the anchor pretensioner according to various embodiments of the present invention.

As illustrated in FIG. 4A, FIG. 4B and FIG. 4C, a locking system, which prevents the reverse direction movement of the rack 13, is illustrated.

That is, when the rack 13 is moved upward by the explosive pressure of the MGG 11, the locking ball 19 is also moved upward together with the rack 13 (drawing in a lap belt).

After the lap belt is drawn in, when the occupant moves forward, force is applied so that the rotator 15 is rotated in the reverse direction, and the rack 13 is moved downward.

In this case, the rack 13 is slightly moved downward, but the locking ball 19 is still moved upward by inertia, and as a result, the downward movement of the rack 13 may be restricted while the locking ball 19 is interposed between the tapered surface 21 formed on the piston portion 20 of the rack 13 and a wall surface of the cylinder 12.

Figure 5A:
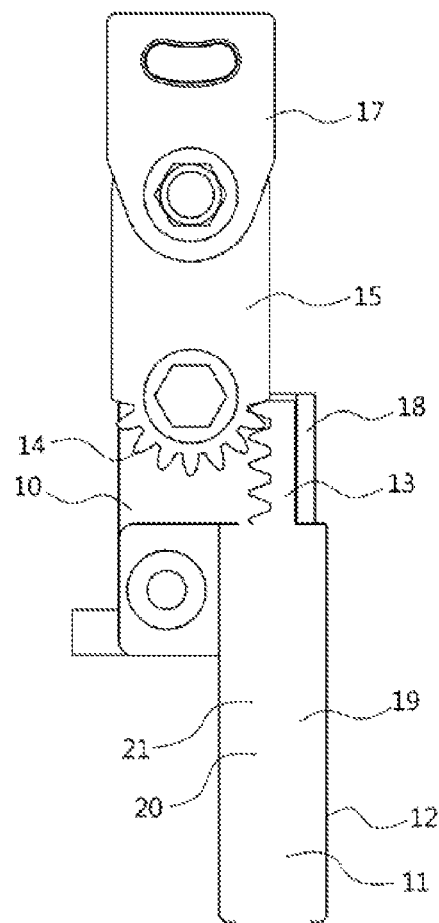
FIG. 5A and FIG. 5B are front views illustrating an operational state of the anchor pretensioner according to the present invention.
Figure 5B:
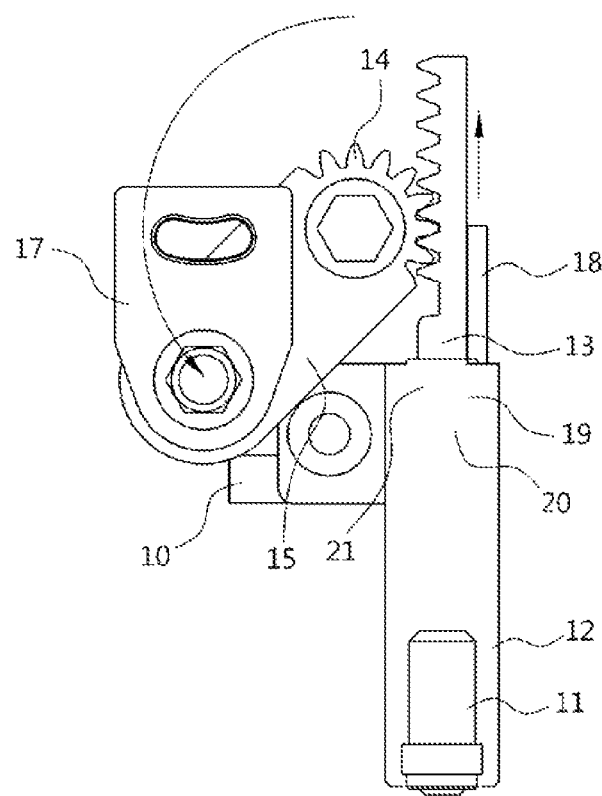

FIG. 5A and FIG. 5B are front views illustrating an operational state of the anchor pretensioner according to various embodiments of the present invention.

As illustrated in FIG. 5A and FIG. 5B, the MGG 11 is ignited by receiving a deployment signal from an Airbag Control Unit (ACU) at the time of a vehicle collision.

Consecutively, the rack 13 is moved along the cylinder 12 by the explosive pressure of the MGG 11, and the rotator 15, which is gear-engaged with the rack 13, is rotated while being tilted downward from the vertical posture.

In this case, the rotator 15 may be rotated downward at about 120° from the vertical posture.

As the rotator 15 is rotated as described above, the webbing 16, which is connected to the lower anchor plate 17, is also rotated in a counterclockwise direction in the drawing.

Accordingly, the webbing 16 is pulled toward a rear side of the vehicle, thereby restricting the body of the occupant.

Figure 6:
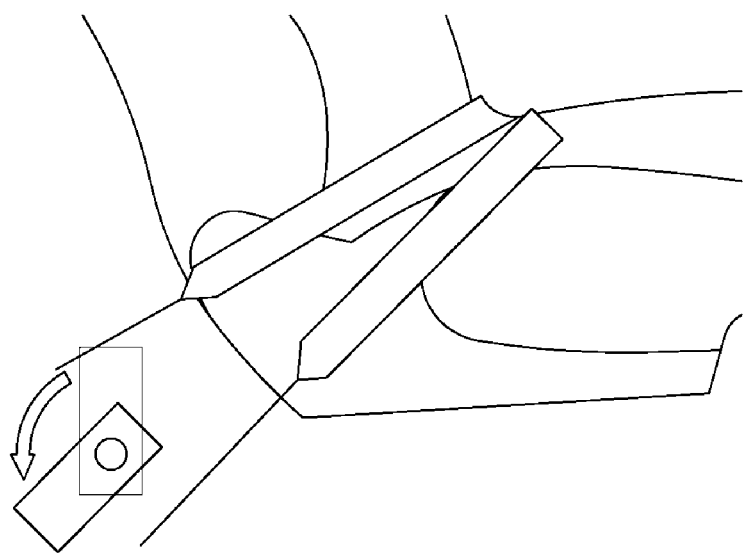
FIG. 6 is a schematic view illustrating an effect of preventing a submarine phenomenon of the exemplary anchor pretensioner according to the present invention.

FIG. 6 is a schematic view illustrating an effect of preventing a submarine phenomenon of the anchor pretensioner according to various embodiments of the present invention.

As illustrated in FIG. 6, there is an effect of preventing a submarine phenomenon by increasing an intersection angle when the occupant is moved forward due to a vehicle collision.

That is, Effective total pressure (Pt) at the anchor pretensioner side is moved in a rearward/downward direction of the vehicle, such that the intersection angle is increased, and as a result, a submarine phenomenon may be eliminated.

Figure 7:
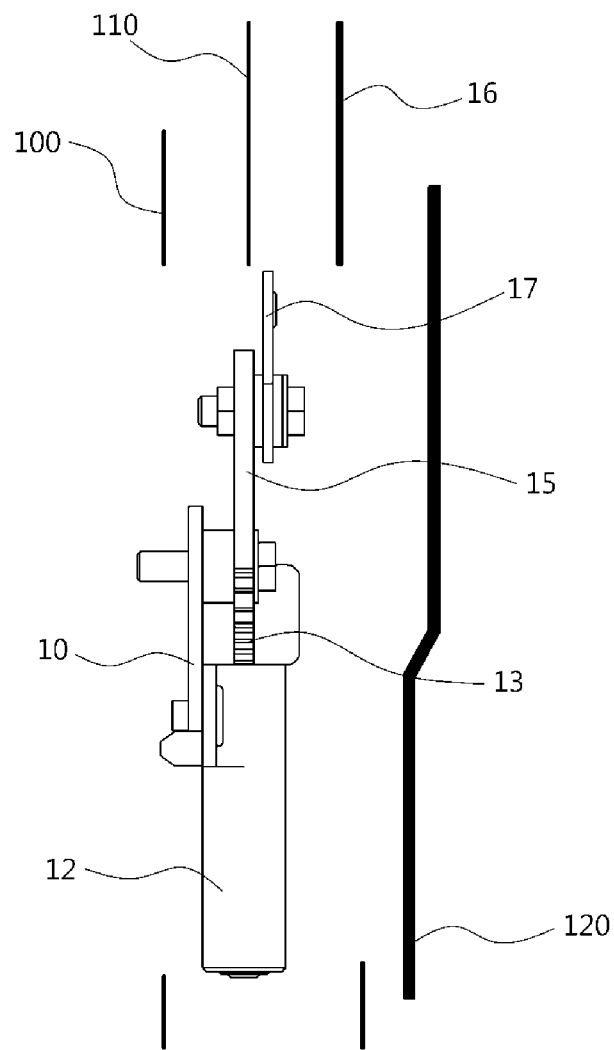
FIG. 7 is a schematic view illustrating an effect of improving an external appearance of the exemplary anchor pretensioner according to the present invention.
Figure 8:
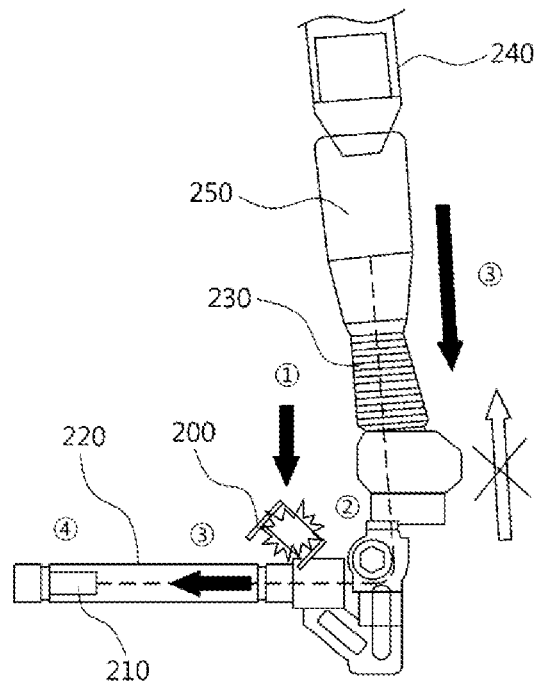
FIG. 8 is a schematic view illustrating a pretensioner in the related art.
Figure 9A:
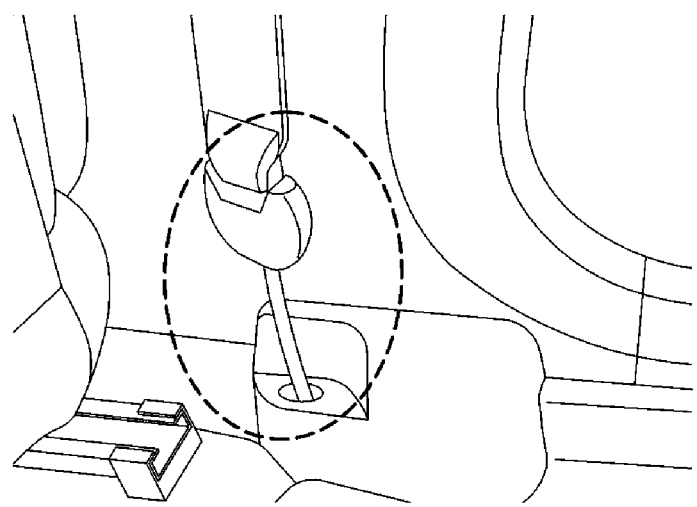

FIG. 7 is a schematic view illustrating an effect of improving an external appearance of the anchor pretensioner according to various embodiments of the present invention.

As illustrated in FIG. 7, there is an effect of improving an external appearance because a cable or the like is not exposed to the outside in a state in which the anchor pretensioner is mounted in the vehicle.

That is, the anchor pretensioner is installed in a space between the vehicle body side or the seat side 100 and the center pillar trim 110 or the seat shield cover, and a trajectory on which the webbing 16 is pulled, and a rotational trajectory of the rotator 15 are ensured by holes (or cut-out portions) formed in the center pillar trim 110, such that components such as a cable associated with the anchor pretensioner are not exposed to the outside.

The holes (or cut-out portions) formed in the center pillar trim 110 are covered by a pretensioner garnish 120.

Therefore, only the webbing 16 is exposed to the outside by the pretensioner garnish 120, thereby improving the external appearance.

As such, in the present invention, the new pretensioner system, which is formed by the combination of the rack that is rectilinearly moved upward and downward, and the rotator that is rotated, is implemented, such that the operation direction of the anchor pretensioner may be changed from the existing axial direction to the rotation direction, thereby improving external appearance quality of the vehicle, and resolving a problem with the submarine phenomenon.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An anchor pretensioner for a vehicle, comprising:
   a bracket installed at a vehicle body side or a seat side;
   a cylinder installed on a lower end portion of the bracket, and in which a microgas generator (MGG) for generating explosive pressure is embedded;
   a rack installed in the cylinder, and moved upward by the explosive pressure;
   a rotator rotatably installed on an upper end portion of the bracket, engaged with the rack through a gear portion at a lower end of the rotator, and rotated when the rack is moved upward; and
   a lower anchor plate coupled to an upper end of the rotator, and connected to a webbing.

2. The anchor pretensioner of claim 1, wherein the cylinder including the rack is installed in a vertical direction and the rotator is rotated while being tilted downward from the vertical direction when the rack is moved upward.

3. The anchor pretensioner of claim 1, further including a stopper formed on the bracket, wherein the stopper is perpendicularly bent from a bracket body, and serves to guide the rack while supporting a back surface of the rack when the rack is moved, and prevents the rack from deviating from the cylinder.

4. The anchor pretensioner of claim 1, wherein a locking ball is interposed in a lower end portion of the rack and prevents reverse direction movement of the rack engaged with the rotator.

5. The anchor pretensioner of claim 4, wherein the locking ball, which prevents the reverse direction movement of the rack, is interposed between a tapered surface formed on a piston portion at a lower end of the rack and the cylinder when the rack is moved downward so as to prevent the reverse direction movement of the rack.

* * * * *